United States Patent [19]

Doemens et al.

[11] Patent Number: 5,750,904
[45] Date of Patent: May 12, 1998

[54] FORCE A DISPLACEMENT SENSOR WITH A CAPACITIVE TRANSDUCER

[75] Inventors: Günter Doemens, Holzkirchen; Markus Gilch, Mauern, both of Germany

[73] Assignee: Siemens Aktiengesellschaft, Munich, Germany

[21] Appl. No.: 793,159

[22] PCT Filed: Aug. 9, 1995

[86] PCT No.: PCT/DE95/01053

§ 371 Date: Feb. 11, 1997

§ 102(e) Date: Feb. 11, 1997

[87] PCT Pub. No.: WO96/05492

PCT Pub. Date: Feb. 22, 1996

[30] Foreign Application Priority Data

Aug. 16, 1994 [DE] Germany ............ 44 29 050.0

[51] Int. Cl.$^6$ .................................. G01L 1/04
[52] U.S. Cl. ................... 73/862.623; 73/862.626
[58] Field of Search ............. 73/862.623, 862.626, 73/724, 514.16, 514.32

[56] References Cited

U.S. PATENT DOCUMENTS

| | | | |
|---|---|---|---|
| 4,289,035 | 9/1981 | Lee ........................... | 73/708 |
| 4,941,363 | 7/1990 | Doemens et al. ............ | 73/862.33 |
| 5,000,048 | 3/1991 | Kordts ....................... | 73/724 |
| 5,397,911 | 3/1995 | Hiyama et al. ............. | 73/514.16 |
| 5,447,067 | 9/1995 | Biebl et al. ................. | 73/514.32 |
| 5,447,068 | 9/1995 | Tang .......................... | 73/514.32 |

FOREIGN PATENT DOCUMENTS

| | | |
|---|---|---|
| 0 354 386 | 2/1990 | European Pat. Off. |
| 27 15 831 | 10/1978 | Germany . |

Primary Examiner—George M. Dombroske
Assistant Examiner—Max H. Noori
Attorney, Agent, or Firm—Hill & Simpson

[57] ABSTRACT

The force or extension sensor has a measuring capacitor (Mk) whose electrode structures (Es1, Es2), of comb-like design and interengaging, can be moved parallel to one another via two securing points (Bp1, Bp2) as a function of the force (F) to be measured or of the extension ($\epsilon$) to be measured. The total capacitance of the measuring capacitor (Mk) is determined by parallel connection of individual electrode pairs. The variation in the total capacitance of the measuring capacitor (Mk) due to variation of the electrode separations (d1) gives information regarding the force (F) to be measured or the extension ($\epsilon$) to be measured. A change in the electrode separations due to thermally induced extensions is compensated by providing, in the electrical series circuit connected to the measuring capacitor (Mk), an identically designed compensating capacitor (Kk) arranged orthogonally to the measuring capacitor (The), the securing points (Bp3, Bp4) of this compensating capacitor (Kk) are selected such that thermally induced variations in the electrode separation (d1, d3) of the measuring capacitor (Mk) and of the compensating capacitor (Kk) have opposite signs.

3 Claims, 1 Drawing Sheet

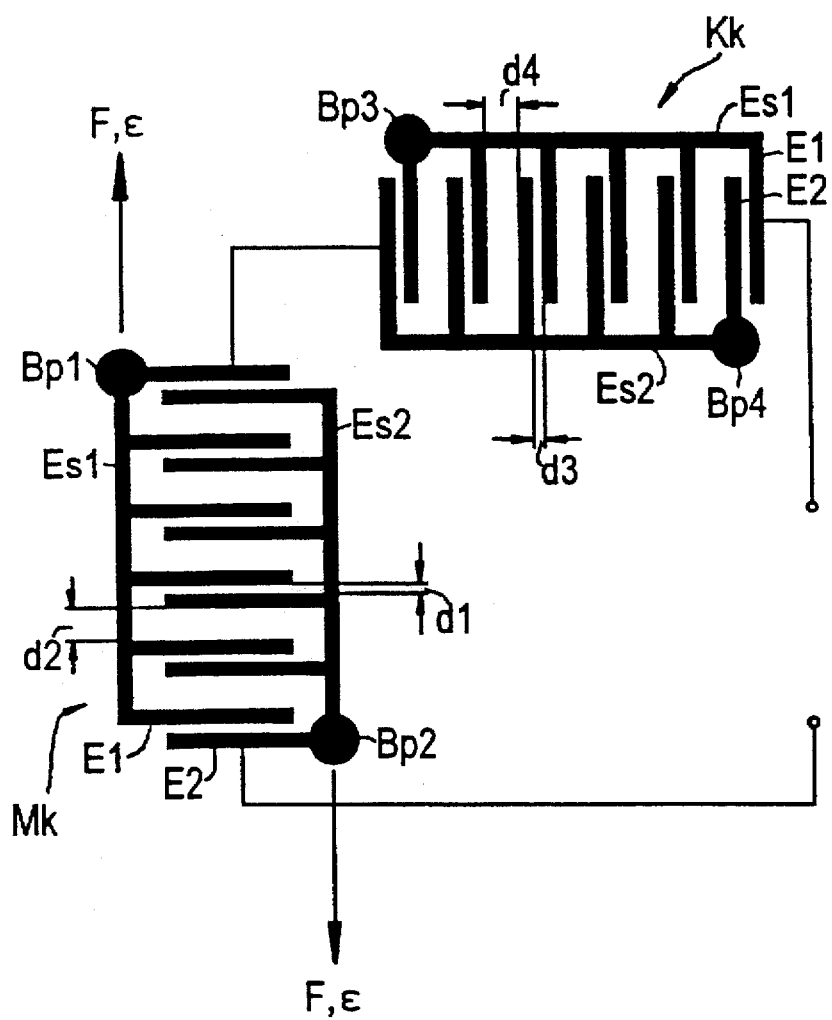

FORCE A DISPLACEMENT SENSOR WITH A CAPACITIVE TRANSDUCER

BACKGROUND OF THE INVENTION

European reference EP-B-0,354,386 discloses a measuring pick-up for length or distance variations with mechanical to electrical conversion of the measured quantities in which, as a variable capacitor, a measuring capacitor with two electrode structures which can be moved parallel to one another is provided. The electrode structures, of comb-like design and interengaging, each consist of a plurality of planar electrodes, arranged parallel with a mutual separation, which are assigned to one another in pairs. Capacitive decoupling is achieved by a highly asymmetric arrangement of the electrode structures, so that the total capacitance of the measuring capacitor is given by connecting in parallel electrode pairs which are each formed by electrodes assigned to one another. The capacitance variation caused by the variable electrode separation of the electrode pairs is used as the measured quantity. The measuring pick-ups are, in particular, used in the contactless measurement of torques on rotating shafts. Using electrode structures designed as micro-structures, torsions of a few micrometers can, for example, be detected. The measuring pick-ups described in European reference EP-B-0,354,386 are only partially suitable for general measurement of the linear force or extension (displacement) since the thermally induced extension directly varies the electrode separations and thereby vitiates the measurement result.

For static or dynamic force or extension measurements, use is generally made of strain gauges which consist of a plurality of loops of thin resistive wire which are embedded in a support made of paper and synthetic resin. This support is adhesively bonded to the measuring point and consequently also undergoes the length variation of the object to be measured at this point. The lengthening or shortening of the wire loops which then occurs produces a resistance change which is proportional to the extension of the object to be measured. Further to applications in which measuring an extension is the primary purpose of the measurement, a force may also be measured, by means of the extension, using a strain gauge. However, limited resistance to cyclic loading and overloads, and elaborate application processes, limit the use of these strain gauges, in particular in plant and machine construction use under rugged conditions.

SUMMARY OF THE INVENTION

The object of the invention is substantially to improve industrial force and extension measurement and considerably to widen its field of application compared to known strain gauges.

In general terms the present invention is a force or extension sensor with a capacitive transducer. Electrode structures of a measuring capacitor are electrically insulated from one another, have a comb-like design and interengage. They can be moved parallel to one another via two securing points as a function of the force to be measured or of the extension to be measured. The total capacitance of the measuring capacitor is determined by parallel connection of individual electrode pairs which are in each case formed by one electrode of one electrode structure and an associated adjacent electrode of the second electrode structure. Within the total measuring range, the electrode separation of the electrode pairs, which can vary according to the force to be measured or the extension to be measured, is small compared to the distance between adjacent electrodes, not assigned to each other, of the two electrode structures. The force to be measured, or the extension to be measured, is determined from t he change in the resulting capacitance of an electrical series circuit comprising a measuring capacitor and an identically designed compensating capacitor arranged orthogonally to the measuring capacitor. The securing points of the compensating capacitor are selected such that the thermally induced variations in the electrode separation of the measuring capacitor and of the compensating capacitor have opposite signs.

Advantageous developments of the present invention are as follows.

The compensating capacitor is arranged directly next to the measuring capacitor.

The securing points of the measuring capacitor and of the compensating capacitor are formed at diagonally opposite corners of the respective electrode structures.

In comparison with strain gauges, the force or extension sensor according to the invention provides the following advantages in particular:

considerably greater overload safety
substantially improved stability under cyclic loading
frequency-based measurement signal
considerably improved linearity and zero point stability
considerably reduced temperature sensitivity and hysteresis
simple application, substantially independent of the expansion coefficient of the support material
cost-efficient construction by micro system technology.

Because of the above advantages, the force or extension sensor according to the invention will replace known strain gauges in many fields, and open up new applications, for example in industrial engineering or in automotive engineering.

The invention is based on the discovery that an electrical series circuit comprising a measuring capacitor and a second, identically designed compensating capacitor can theoretically permit the exact compensation of the effect of temperature if the compensating capacitor is aligned orthogonally to the measuring capacitor and the securing points of the compensating capacitor are selected in such a way that the thermally induced variations in the electrode separations of the measuring capacitor and the compensating capacitor have opposite signs.

By arranging the measuring capacitor and the compensating capacitor immediately next to one another, the configuration according to FIG. 2 ensures equal effects of temperature on the electrode separations of the two capacitors, so that by virtue of the series circuit and by virtue of the opposite signs of the variations of the electrode distances, exact compensation of the effect of temperature actually results.

For for securing the electrode structures and for compensating for the effect of temperature, it is particularly advantageous if the securing points of the measuring capacitor and of the compensating capacitor are formed at diagonally opposite corners of the respective electrode structures.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, and in which:

The single FIGURE depicts a force or extension sensor according to the present invention.

DESCRIPTION OF THE PREFERRED EMBODIMENTS

In a greatly simplified schematic representation, the single FIGURE shows a force or extension sensor with an electrical series circuit comprising a measuring capacitor and a second, identically designed compensating capacitor Kk, which is arranged orthogonally to the measuring capacitor Mk. Both the measuring capacitor Mk and the compensating capacitor Kk are formed by two comb-like electrode structures Es1 and Es2, the electrodes E1 and E2 of which are arranged in such a way that, in each case, a small electrode separation d1 or d3 and a substantially larger electrode separation d2 or d4 alternate with one another. Accordingly, capacitances formed by electrode pairs with the separation d2 or d4 are negligibly small compared to the capacitances formed by the separations d1 or d3 of the electrode pairs. The total capacitances of the measuring capacitor Mk and of the compensating capacitor Kk are thus each given by parallel connection of the electrode pairs with the electrode separation d1 or d3, respectively.

In the measuring capacitor Mk, the two electrode structures Es1 and Es2, with comb-like design, can be moved parallel to one another via securing points Bp1 and Bp2 at corners diagonally opposite each other as a function of the force F to be measured or of the extension $\epsilon$ to be measured. In the illustrative embodiment represented, the force F to be measured or the extension $\epsilon$ to be measured or a thermally induced extension causes a corresponding increase of the electrode separation d1.

In the compensating capacitor Kk, the two electrode structures Es1 and Es2, with comb-like design, can be moved parallel to one another via securing points Bp3 and Bp4 at corners diagonally opposite each other as a function of a thermally induced extension. The securing points Bp3 and Bp4 are in this case arranged, in comparison to the fastening points Bp1 and Bp2, at other corners of the electrode structures Es1 and Es2, so that thermally induced variations of the electrode separation d1 of the measuring capacitor Mk and of the electrode separation d3 of the compensating capacitor Kk have opposite signs. In the illustrative embodiment represented, a thermally induced extension causes a corresponding shortening of the electrode separation d3 in a direction perpendicular to the force F to be measured or to the extension $\epsilon$ to be measured.

The securing points Bp1 and Bp2 of the measuring capacitor Mk and the securing points Bp3 and Bp4 of the compensating capacitor Kk are, for example, connected to a support (not represented in further detail in the drawing) while being electrically insulated, this support being, for its part, fitted to the object to be measured (likewise not represented in further detail) for example with the aid of screws. It is also possible to fit the securing points Bp1 and Bp2 or Bp3 and Bp4 directly to the object to be measured. The electrically insulated securing is, for example, carried out with the aid of small ceramic plates, metallized on both sides, which are connected by soldering to the securing points Bp1 and Bp2 or Bp3 and Bp4 and to the support.

In the above-described arrangement and configuration of the measuring capacitor Mk and of the compensating capacitor Kk, the following relationships hold for the electrode separations d1 and d3, respectively:

$$d1 = d01 + \Delta df + \Delta dt$$

$$d3 = d03 - \Delta dT,$$

do1 being the original electrode separation of the measuring capacitor Mk, d03 being the original electrode separation of the compensating capacitor Kk, $\Delta dF$ being the variation in the electrode separation due to the force F and $\Delta dT$ being the thermally induced variation in the electrode separation. The thermally induced variations $\Delta dT$ of the measuring capacitor Mk and of the compensating capacitor Kk are in this case of equal size, but in opposite directions to each other.

The capacitance C1 of the measuring capacitor Mk is then equal to $$C1 = \frac{\epsilon 0 \cdot A}{do1 + \Delta dF + \Delta dT}$$

$\epsilon$ being the dielectric constant and A being the surface area of the overlap region of the electrode pair.

The capacitance C2 of the compensating capacitor Kk is equal to $$C2 = \frac{\epsilon 0 \cdot A}{do3 - \Delta dt}$$

When the measuring capacitor Mk and the compensating capacitor Kk are electrically connected in series, the resulting capacitance C is given as follows $$1/C = 1/C1 + 1/C2$$

$$1/C = \frac{d01 + \Delta dF + \Delta dt}{\epsilon 0 \cdot A} + \frac{d03 - \Delta dT}{\epsilon 0 \cdot A} \text{ or } C = \frac{\epsilon 0 \cdot A}{d01 + d03 + \epsilon dF}$$

The resulting capacitance C is thus dependent only on the variation $\Delta dF$ due to the force F, while an effect of temperature on the force F to be measured or the extension $\epsilon$ to be measured is, at least theoretically, fully compensated.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A force or displacement sensor with a capacitive transducer, comprising:

a measuring capacitor having electrode structures that are electrically insulated from one another, that have a comb configuration and interengage, that are parallel to one another via two securing points thereof as a function of a force to be measured or of an extension to be measured, each electrode structure having electrode pairs;

a total capacitance of the measuring capacitor by parallel connection of individual electrode pairs each pair being formed by one electrode of a first electrode structure of the electrode structures and an associated adjacent electrode of a second electrode structure of the electrode structures;

within a total measuring range, electrode separation of the electrode pairs, which varies according to the force to be measured or the displacement to be measured, being small compared to a distance between adjacent electrodes, not assigned to each other, of the electrode structures;

the force to be measured, or the displacement to be measured, determined from a change in a resulting capacitance of an electrical series circuit having measuring capacitor and a substantial compensating capacitor arranged orthogonally to the measuring capacitor;

the securing points of the compensating capacitor being selected such that thermally induced variations in electrode separation of the measuring capacitor and of the compensating capacitor have opposite signs.

2. The force or extension sensor as claimed in claim 1, wherein the compensating capacitor is arranged directly next to the measuring capacitor.

3. The force or extension sensor as claimed in claim 1, wherein securing points of the measuring capacitor and of the compensating capacitor are formed at diagonally opposite corners of respective electrode structures of the electrode structures.

* * * * *